(12) United States Patent
Nilsson

(10) Patent No.: US 12,458,950 B2
(45) Date of Patent: Nov. 4, 2025

(54) ADSORBENT AND A KIT CONTAINING SAID ADSORBENT IN A COLUMN

(71) Applicant: GLYCOPROBE AB, Lund (SE)

(72) Inventor: Kurt Nilsson, Trelleborg (SE)

(73) Assignee: GLYCOPROBE AB, Lund (SE)

( * ) Notice: Subject to any disclaimer, the term of this patent is extended or adjusted under 35 U.S.C. 154(b) by 732 days.

(21) Appl. No.: 17/772,427

(22) PCT Filed: Oct. 29, 2020

(86) PCT No.: PCT/SE2020/051051
§ 371 (c)(1),
(2) Date: Apr. 27, 2022

(87) PCT Pub. No.: WO2021/086259
PCT Pub. Date: May 6, 2021

(65) Prior Publication Data
US 2023/0302429 A1    Sep. 28, 2023

(30) Foreign Application Priority Data

Oct. 30, 2019    (SE) .................................. 1900180-9

(51) Int. Cl.
| | |
|---|---|
| *B01J 20/24* | (2006.01) |
| *A61L 2/06* | (2006.01) |
| *B01J 20/28* | (2006.01) |
| *B01J 20/289* | (2006.01) |

(52) U.S. Cl.
CPC .............. *B01J 20/24* (2013.01); *A61L 2/06* (2013.01); *B01J 20/28016* (2013.01); *B01J 20/28052* (2013.01); *B01J 20/289* (2013.01); *B01J 2220/54* (2013.01)

(58) Field of Classification Search
CPC ..... A61P 37/00; B01J 20/3274; B01J 20/3285
See application file for complete search history.

(56) References Cited

U.S. PATENT DOCUMENTS

| | | |
|---|---|---|
| 6,686,457 B1 | 2/2004 | Nilsson |
| 9,012,405 B2 | 4/2015 | Haro Villar et al. |
| 10,076,600 B2 | 9/2018 | Smith et al. |
| 2002/0146814 A1 | 10/2002 | Nilsson |
| 2014/0092937 A1* | 4/2014 | Azad ............... A61B 50/30 374/E11.018 |
| 2014/0284274 A1 | 9/2014 | Nilsson |
| 2018/0093032 A1 | 4/2018 | Smith |

FOREIGN PATENT DOCUMENTS

| | | |
|---|---|---|
| EP | 0 306 617 A2 | 3/1989 |
| WO | 2008/090360 A1 | 7/2008 |
| WO | 2013/062479 A1 | 5/2013 |
| WO | 2014/141244 A1 | 9/2014 |
| WO | 2015/181393 A1 | 12/2015 |
| WO | 2019/172836 A1 | 9/2019 |

OTHER PUBLICATIONS

Extended European Search Report dated Oct. 17, 2023 for European Patent Application No. 20881754.4 (8 pages).
Aviñó, A., et al. Oligonucleotide-Peptide Conjugates: Solid-Phase Synthesis under Acidic Conditions and Use in ELISA Assays. Molecules. 2012. vol. 17. pp. 13825-13843.
Pérez, M., et al. Antibodies to Citrullinated Human Fibrinogen Synthetic Peptides in Diagnosing Rheumatoid Arthritis. J. Med. Chem. 2007. vol. 50. pp. 3573-3584.
International Search Report dated Jan. 12, 2020 for International Patent Application No. PCT/SE2020/051051 (7 Pages).
Written Opinion of the International Searching Authority dated Jan. 12, 2020 for International Patent Application No. PCT/SE2020/051051 ( 10 Pages).
International Preliminary Report on Patentability dated Dec. 21, 2022 for International Patent Application No. PCT/SE2020/051051 ( 7 Pages).
Sebbag, M. et al. Epitopes of human fibrin recognized by the rheumatoid arthritis-specific autoantibodies to citrullinated proteins. Eur. J. Immunol. 2006. vol 36., No. 8, pp. 2250-2263.

* cited by examiner

*Primary Examiner* — Bradley R Spies
(74) *Attorney, Agent, or Firm* — Smith, Gambrell & Russell, LLP

(57) ABSTRACT

An adsorbent comprising at least two types of covalently bound antigens having the ability to bind at least one component present in a blood flow or blood plasma flow passing through said adsorbent is disclosed, as well as a column containing said adsorbent, a kit containing said column in a sealed plastic bag, a method for the production of said kit, a method for reduction or elimination of undesired blood group specific antibodies or autoimmune antibodies in connection with autoimmune diseases, a method for treatment of myasthenia gravis, and a method for treatment of rheumatoid arthritis.

11 Claims, No Drawings

ADSORBENT AND A KIT CONTAINING SAID ADSORBENT IN A COLUMN

The present invention refers to an adsorbent comprising at least two types of covalently bound antigens having the ability to bind at least one component present in a blood flow or blood plasma flow passing through said adsorbent is disclosed, to a column containing said adsorbent, to a kit containing said column in a sealed plastic bag, to a method for the production of said kit, to a method for reduction or elimination of undesired blood group specific antibodies or autoimmune antibodies in connection with autoimmune diseases, to a method for treatment of myasthenia gravis, and to a method for treatment of rheumatoid arthritis.

SUMMARY OF THE INVENTION

In one aspect the present invention relates to an adsorbent comprising at least two types of covalently bound antigens having the ability to bind at least one component present in a blood flow or blood plasma flow passing through said adsorbent, wherein said at least two types of antigen comprises at least one linear peptide and at least one cyclic peptide, wherein optionally a spacer is provided between the peptide and the adsorbent In one embodiment of said adsorbent said at least one linear peptide is at least one linear citrullinated peptide and said at least one cyclic peptide is at least one cyclic citrullinated peptide.

In one embodiment of said adsorbent said at least one cyclic citrullinated peptide is derived from a peptide sequence having the ability to bind to certain autoantibodies found in blood from patients with autoimmune diseases, preferably rheumatoid arthritis (RA), wherein said peptide sequence is derived from a protein selected from filaggrin, fibrin, fibrinogen, vimentin, and enolase.

In one embodiment said adsorbent comprises said cyclic citrullinated peptide HQCHQESTXGRSRGRCGRSGS, wherein X denotes a citrulline residue, and at least one linear citrullinated peptide selected from α36-50, β60-74, α501-515, and α621-635.

In one embodiment said adsorbent comprises a porous matrix in the form of beads, preferably cross-linked agarose, each containing at least one of said covalently bound antigens.

In one embodiment of said adsorbent the antigen is linked via an amide bond or an —NH—CH$_2$— to the adsorbent matrix via a spacer between the antigen and the adsorbent matrix.

In a further aspect the present invention refers to a column for separation of components from a flow of blood or blood plasma, wherein said column comprises the adsorbent according to the present invention.

In one embodiment said column comprises a cylinder having a first lock at the top and a second lock at the bottom, wherein a first porous net is arranged within the column adjacent to said first lock and a second porous net is arranged within the column adjacent to said second lock, wherein the adsorbent is situated between said first and second porous net, wherein said column also is provided with a first plastic tube in an inlet at the top and with a second plastic tube in an outlet at the bottom allowing passage of the flow of blood or blood plasma through the column and the adsorbent therein, and wherein said first and second plastic tube are connected with each other via a female/male luer coupling.

In another aspect the present invention refers to a kit containing the column according to according to the present invention within a sealed plastic bag, wherein all of the components within said sealed plastic bag are sterile.

In one embodiment of said kit the plastic bag has resistance against penetration of microorganisms, and at least one side of the plastic bag is permeable for steam used in an autoclaving procedure.

In one embodiment of said kit the adsorbent comprises, in addition to or instead of the adsorbent according to according to the present invention, at least one protein as the antigen, preferably MuSK (common autoantibodies in connection with Myasthenia gravis), RF (Rheumatoid factor), or a recombinant form thereof.

In one embodiment of said kit said at least one linear peptide and said at least one cyclic peptide in the adsorbent according the present invention are replaced with at least one carbohydrate, wherein said carbohydrate is selected from lactosamine, Galβ1-3GalNAc, GalNAcα-Serine, a blood group A or B antigen, or a ganglioside, optionally bound to the adsorbent via a spacer.

In still another aspect the present invention refers to a method for the production of the kit according to according to the present invention, wherein the column provided with the adsorbent therein is placed in the plastic bag, wherein said plastic bag is sealed, and wherein the sealed plastic bag containing the column including said adsorbent is sterilized, preferably by autoclavation, wherein steam permeates the wall of the sealed plastic bag into the interior thereof.

In still another aspect the present invention refers to method for reduction or elimination of undesired blood group specific antibodies or autoimmune antibodies in connection with autoimmune diseases, wherein blood or blood plasma is brought to pass through the column of the kit according to according to the present invention via openings in the locks of the column, wherein said undesired blood group specific antibodies or autoimmune antibodies are bound to the adsorbent, and wherein blood or blood plasma having a reduced or eliminated content of said undesired blood group specific antibodies or autoimmune antibodies is collected after having passed through said kit.

In still another aspect the present invention refers to method for treatment of myasthenia gravis, wherein blood or blood plasma from a patient suffering from myasthenia gravis is brought to pass through the column of the kit according to the present invention via openings in the locks of the column, wherein common autoantibodies existing in connection with myasthenia gravis are bound to the adsorbent, and wherein blood or blood plasma having a reduced or eliminated content of said common autoantibodies existing in connection with myasthenia gravis is collected after having passed through said kit and is returned back to the patient.

In still another aspect the present invention refers to method for treatment of rheumatoid arthritis, wherein blood or blood plasma from a patient suffering from rheumatoid arthritis (RA) is brought to pass through the column of the kit according to the present invention via openings in the locks of the column, wherein autoantibodies existing in connection with rheumatoid arthritis are bound to the adsorbent, and wherein blood or blood plasma having a reduced or eliminated content of said autoantibodies existing in connection with rheumatoid arthritis is collected after having passed through said kit and is returned back to the patient.

DETAILED DESCRIPTION OF THE INVENTION

As mentioned above the present invention refers in one aspect to a kit or a product for binding of and reduction of proteins in human blood and in human blood plasma. The kit contains a sealed plastic bag. Inside the plastic bag is a column, which contains a first lock at the top and a second lock at the bottom of a cylinder. The column contains an adsorbent situated between two porous nets inside the column. The nets are placed between the lock and the cylinder at the top and at the bottom of the cylinder. The adsorbent is characterized by that it can selectively bind antibody or other protein from human plasma and by that the adsorbent thus can selectively reduce the content of the antibody or the protein in human blood or plasma upon passage of the blood or plasma from the inlet through the adsorbent to the outlet of the column. Each one of the nets of the column is preferably sealed by the use of a silicon ring placed between the lock and the cylinder of the column. The cylinder contains on its side a hole for filling of the adsorbent into the cylinder and the adsorbent is thus filled between the two nets inside the column. After filling of the adsorbent, the hole for filling is sealed with a plastic plug. The column contains two plastic tubes, one connected to the inlet of the column and one connected to the outlet of the column, thus allowing a flow of blood or plasma through the column. The end of one of the tubes is connected to e.g. a female luer coupling and the other tube is connected to e.g. a male luer coupling.

The kit is further characterized by that it has been sterilised, preferably autoclaved with steam, and by that the autoclaving procedure not only sterilises the inside of the plastic bag and the outside of the column, but also sterilises the inside of the column and the adsorbent inside the column. The kit is further characterized by that before autoclaving the column with the adsorbent is placed inside the plastic bag. Then the plastic bag is sealed and the kit is autoclaved. The kit is further characterized by that the plastic bag of the product on at least one side is permeable for steam, but have resistance against penetration of microorganisms over the whole outer surface and functions as a sterile barrier, minimizing the risk of non-sterility of the adsorbent and the inside of the column.

This significantly increases the reliability and safety of use of the kit according to the invention compared to previous autoclaved columns. The latter are sterile on the inside (flow path) and outside of the column directly after sterilisation with steam, but when the autoclave is opened the outside of the column is contaminated with bacteria and virus, thus increasing the risk of bacterial contamination over time of the adsorbent inside the column. These columns thus pose the risk of a) contamination of blood or blood plasma that passes through the adsorbent with pathogens and b) bacterial enzymes degrading and or changing the chemical structure of the adsorbent leading to decreased efficiency and/or non-specific binding of plasma proteins and other plasma components, as well as to an increased risk of activation of plasma proteins such as coagulation factors and complement. The kit of the present invention thus minimises these risks by keeping also the outside of the column sterile until use of the product.

The plastic bag is chosen from the size and suitability of the bag for steam sterilization and also from its function as a sterile barrier. The bag can be chosen from commercially available plastic bags for this purpose. There are commercially available sealing machines that are suitable for sealing of the plastic bag. A characteristic of the kit according to the invention is that the plastic bag and the sterilization, i.e. autoclaving with steam, do not influence the integrity of the column, the adsorbent or their function, performance and safety to any significant negative degree. An example of sterilization is autoclaving with steam at a temperature inside of the column of at least 100° C., preferably at 121° C., for at least 21 minutes.

When the kit is used, the sealing of the outer bag is opened and the luer couplings of the column are used a) to connect the tubes with each other before and during autoclaving and b) to connect the column to a blood line or blood plasma line, which will allow for a flow of blood or blood plasma to the inlet of the column, through the column and the adsorbent and out from the column, and c) to connect the column to the plasma line from a plasma separator and allow continuous treatment of plasma from a patient and return of treated plasma to the blood line of the plasma separator and back to the patient.

The adsorbent is characterized by that it contains a porous matrix in the form of beads containing at least one type of covalently bound antigen that can bind the antibody or protein. The beads have a high aqueous content allowing easy passage of plasma between the beads and through the pores of the beads, as well as passage through the beads of larger proteins such as IgM and IgG. The adsorbent matrix can be cross-linked agarose, but can also be chosen from another matrix of high porosity and tolerance towards autoclaving. The antigen can be a carbohydrate, a carbohydrate derivative, a peptide, a peptide derivative or a protein.

E.g., the carbohydrate can be derivatised with a spacer molecule for covalent binding to the adsorbent. Examples of carbohydrate antigens are lactosamine, Galb1-3GalNAc, an α2-3 or α2-6 sialylated lactosamine or Galb1-3GalNAc, GalNAcα-Serine, a blood group antigen, or a ganglioside, wherein optionally a spacer is provided between the peptide and the adsorbent.

When a protein or peptide is used as antigen, the protein or peptide can in one embodiment be bound covalently directly to the matrix, without derivatisation of the peptide or protein with a spacer, via for example the terminal amino group or another amino group on the peptide or protein. The protein or peptide can in another embodiment alternatively be bound via a spacer between the matrix and the protein or peptide. Examples of a protein antigen is MuSK or a recombinant form thereof. Examples of peptide antigens are an α-, β-, γ- or d-peptide of ACHR (acetylcholine receptor) or a peptide derivative thereof, and at least one citrullinated peptide in which at least one arginine has been replaced by a citrulline residue. The amino acid sequence of the latter peptides can be derived from for example fibrin, fibrinogen, filaggrin, vimentin or enolase. These exemplified peptide and protein antigens are known to bind to different autoantibodies occurring in various autoimmune diseases.

When the antigen is a carbohydrate derivative the spacer molecule is glycosidically bound to the carbohydrate. The spacer consists of an aliphatic and/or aromatic compound. Examples of spacer are —O—$(CH_2)_n$NH—, —O—$(CH_2)_n$PhNH—, and —O-Ph$(CH_2)_n$NH—, where —O— is glycosidically linked to the carbohydrate or carbohydrate derivative, Ph denotes a phenyl group, n is an integer, preferably one of 1, 2, 3, 4, 5, or 6, and NH— is linked either directly to the porous matrix or is linked via for example a NH—CO— bond to a secondary spacer linked to the matrix. The spacer is covalently linked to the porous matrix via for example an amide bond or a NH—$CH_2$— bond (carbohydrate-O-spacer-NH—CO—R-matrix or carbohydrate-O-spacer-NH—$CH_2$-matrix) where the latter bond is to a carbon atom of the agarose galactose. The R group can be an extra spacer molecule, e.g. —$(CH_2)$n-.

When the antigen is a peptide the spacer molecule is for example linked via an amido linkage to the peptide N-terminal amino acid. This can be achieved by coupling of the protein or peptide to carboxyl groups of the matrix, for example using N-hydroxy succinimide (NHS—) activated carboxyl groups linked via a spacer to a crosslinked agarose matrix. The term "spacer" is exemplified above under the disclosure of carbohydrate antigens. Alternatively, an amino group containing spacer can be bound at the N-terminal of the peptide, $NH_2$-spacer-CO—NH-peptide. The $NH_2$-group can then be coupled to NHS-activated agarose to give a NH—CO linkage. Alternatively, the C-terminal of the peptide can be provided with a spacer-$NH_2$ group for coupling to NHS-activated agarose. When the C-terminal of the peptide is not used for coupling it can be in the form of a carboxyl group or in the form of for example an amide group. These alternatives may chosen by the expert depending of the specific application. Alternatively, the protein or peptide can be coupled by forming for example a direct linkage to the matrix, i.e. a —NH—CH-matrix linkage, using e.g. tosyl activated matrix, as described above.

When the antigen is a peptide, the column can contain more than one adsorbent, where each adsorbent contains a different peptide, for example different citrullinated peptides. Thus, two, three, four or more different peptide adsorbents can be used in one column to allow for a larger reduction of antibodies specific for different peptide isotypes on for example citrullinated fibrinogen. The adsorbents are mixed before filling into the column. The volume of the different adsorbents in the column can for example be the same, or the different adsorbents can have different volumes.

In one embodiment of the invention, the adsorbent contains at least one cyclic peptide and at least one linear peptide, preferably at least one cyclic citrullinated peptide and at least one linear citrullinated peptide. The cyclic peptide is derived from a protein peptide sequence that bind certain autoantibodies found in connection with autoimmune diseases. The cyclic citrulline-containing peptide is derived from a protein peptide sequence that bind certain autoantibodies which frequently can be found in the blood of patients with certain autoimmune diseases, e.g. Rheumatoid arthritis (RA below). Examples of such citrullinated proteins are filaggrin, fibrin and fibrinogen, vimentin and enolase. An example of a cyclic citrullinated peptide is the sequence HQCHQESTXGRSRGRCGRSGS. In this peptide sequence each letter codes for an amino acid residue according to common nomenclature (H=Histidine, S=Serine, G=Glycine residue, etc), X denotes a citrulline residue. In this cyclic peptide, two serine residues in the natural peptide sequence have been substituted by two cysteines (C) which have been joined to form cystine, thus yielding the cyclic citrullinated peptide. The adsorbent is formed by covalent linkage of the peptide to cross-linked agarose beads, using for example NHS-activated agarose beads. A further characteristic of this embodiment of the invention is that the adsorbent filled in the column preferably contains two, three, four or more citrulline containing peptides derived from citrullinated protein peptide sequences found in RA patients and of which at least one is a cyclic citrullinated peptide. The presence of at least one cyclic citrullinated peptide and at least one linear citrullinated peptide in the adsorbent has turned out to give surprisingly satisfactory results, i.e. was found to bind more RA associated antibody than using an adsorbent with only cyclic peptide or using an adsorbent with only linear peptides. The peptides are preferably linked separately to the adsorbent, and thereafter the different peptide adsorbents are mixed together before they are filled in the column.

As an example of an experiment performed, a column containing a) an adsorbent containing one, two, or four different, citrullinated fibrin-derived linear peptides selected from the citrullinated fibrin-derived amino acid sequences $\alpha$36-50, $\beta$60-74, $\alpha$501-515 and $\alpha$621-635 (see e.g. Eur. J. Immunol, 2006, page 2255), each one covalently coupled to agarose, and b) an adsorbent with the covalently coupled citrullinated cyclic peptide sequence exemplified above, was shown to bind considerably more RA associated antibody from the same RA plasma than a column containing only the linear peptide adsorbent above (i.e. containing one, two, or four citrullinated fibrin derived peptides. The column was also found to bind considerably more RA associated antibody from the same RA plasma than a column with adsorbent that contained only the citrullinated cyclic peptide.

Also, when passing the RA plasma first through a column containing the cyclic peptide-containing adsorbent and thereafter through a column containing the flinear peptides, there was a further reduction of RA antibodies (compared with using only the cyclic peptide adsorbent column). Similarly, when first passing the RA plasma through a column containing one, two, or four linear peptides and thereafter passing the RA plasma through the column containing the cyclic peptide, this latter column further reduced the RA antibody content in the RA plasma.

All the experiments where performed on autoclaved columns as described above. As mentioned above, this is important to assure sterility to avoid bacterial and viral contamination of the human blood/blood plasma and also avoid bacterial enzymes that can modify the adsorbent and peptide antigens.

The adsorbent according to the present invention was specific and tolerated sterilisation by autoclaving, as described above, with retained properties. Thus, IgG and IgM antibodies were practically exclusively found in the eluate from the columns (elution by acidic pH) and there was no or minimal binding of antibody or other blood components in when passing plasma from healthy blood donors through the product (practically no antibody or protein found in eluate). Moreover, the capacity allowed at least 50 volumes of plasma/total adsorbent volume to pass the product with retained antibody binding and specificity.

The specific adsorbent according to the present invention disclosed above can be combined with one or more adsorbents containing one or more antigens that bind other types of antibodies, such as Rheumatoid factor (RF), to further reduce the content in the plasma of antibodies associated with rheumatoid arthritis. For an adsorbent with covalently bound blood group antigens, the column can contain one adsorbent containing blood group A antigen and another adsorbent containing blood group B antigen. Also, two or more adsorbents with one or more of the different subtypes of blood group groups can be filled in the column. This type of column was also found to be autoclavable in a sealed bag as described above and with retained properties.

The total volume of adsorbent according to the invention in the column is for example 60 mL or of a value that is between 5 mL and 300 mL, preferably of a value between 15 mL and 70 mL.

A higher or a lower total quantity of adsorbent in the column can be chosen depending on the flow rate of plasma used and also depending on the volume of the plasma that is intended to pass through the column.

The flow rate is chosen preferably with a value that is between 10 and 60 mL per minute.

When a derivative of any of the carbohydrate compounds described above is used as ligand, i.e. antigen, in the inventive method, a lower concentration of ligand can be used per mL of matrix, for example a quantity in the range 0.1 micromole ligand/mL matrix up to 20 micromole ligand per mL matrix. When adsorbents containing at least one peptide or protein is used as adsorbent, a peptide or protein content in the range of between 0.1 mg to 15 mg/ml of each adsorbent is used, preferably a value in the range 1 to 10 mg/ml of each adsorbent. Adsorbent beads can have an average diameter size chosen in the range from 40 to 300 micrometres. In general, a diameter in the higher part of this range can be chosen for passage of whole blood to allow for passage of the blood cells.

With this type of adsorbent, the treatment of the whole blood or blood plasma can be prolonged. Thus, when treating plasma, more plasma volumes can be treated per treatment, or the same plasma volume can be allowed to pass more than one time. For example, when treating a patient, up to 10 plasma volumes can be treated. It has been shown that up to 20 L of plasma can be treated without saturation of the column (the column still binds antibody or protein after passage of 20 L) when the adsorbent volume is above 50 mL.

For reduction of the antibody or protein in blood or plasma, the column is removed from the plastic bag. The inlet of the column can, via one of the column's luer couplings, be connected to a blood line or blood plasma line from a container. The blood or blood plasma passing the product can be returned back to the container or to a collection bag.

Alternatively, a plasma separator containing a plasma filter can be connected to a bloodline from a patient and the plasma line be connected to the column via a luer coupling. The plasma filter continuously filters out plasma, which is pumped to and through the column, and the plasma is continuously returned to the blood line of the plasma separator.

The plasma passes through a tube from the plasma filter to the tube of the column inlet, through the column with the adsorbent according to the invention, and the treated plasma from the column outlet is returned via a second tube connected via a luer coupling to a tube of the plasma separator connected to the blood line after the plasma filter. The bloodline after the plasma filter, now mixed with treated plasma, is continuously returned back to the patient in a continuous flow extra-corporal treatment. The bloodline that leads back to the patient contains a reduced quantity of the portion of the antibodies in the plasma that has specificity towards the adsorbent antigen(s) and thus is bound to the antigen (the carbohydrate, peptide or the protein) of the adsorbent inside the column. As mentioned before, relatively large volumes can be treated. This will result in a lowered content of the protein or antibody in the blood, for example a blood group specific antibody or an autoantibody in autoimmune disease, such as an antibody specific for an ACHR epitope or Musk (common autoantibodies in Myasthenia gravis) or an RA specific antibody (common in rheumatoid arthritis).

If desired, the column can be washed after treatment, for example with buffered of lower pH to elute bound antibody or protein and then with saline buffer to allow for repeated use of the column. As mentioned above, the column according to the invention allows for a second autoclaving procedure to sterilize the column after use and washing. The treatment can be performed simultaneously with for example dialysis or during ECMO treatment.

The invention claimed is:

1. An adsorbent comprising at least two types of covalently bound antigens having the ability to bind at least one component present in a blood flow or blood plasma flow passing through said adsorbent, wherein said at least two types of antigen comprises at least one linear peptide and at least one cyclic peptide, and optionally at least one protein,
wherein optionally a spacer is provided between the peptide and the adsorbent,
wherein said at least one linear peptide is at least one linear citrullinated peptide and wherein said at least one cyclic peptide is at least one cyclic citrullinated peptide, wherein said at least one cyclic citrullinated peptide is derived from a peptide sequence having the ability to bind to certain autoantibodies found in blood from patients with rheumatoid arthritis (RA), wherein said peptide sequence is derived from a protein selected from filaggrin, fibrin, fibrinogen, vimentin, and enolase.

2. The adsorbent according to claim 1, wherein said adsorbent comprises said cyclic citrullinated peptide HQCHQESTXGRSRGRCGRSGS, wherein X denotes a citrulline residue, and at least one linear citrullinated fibrin-derived peptide selected from α36-50, β60-74, α501-515, and α621-635.

3. The adsorbent according to claim 1, wherein it comprises a porous matrix in the form of beads, preferably cross-linked agarose, each containing at least one of said covalently bound antigens.

4. The adsorbent according to claim 1, wherein the antigen is linked via an amide bond or an —NH—CH$_2$— to the adsorbent matrix via a spacer between the antigen and the adsorbent matrix.

5. A column for separation of components from a flow of blood or blood plasma, wherein said column comprises the adsorbent according to claim 1.

6. The column according to claim 5, wherein said column comprises a cylinder having a first lock at the top and a second lock at the bottom, wherein a first porous net is arranged within the column adjacent to said first lock and a second porous net is arranged within the column adjacent to said second lock, wherein the adsorbent is situated between said first and second porous net, wherein said column also is provided with a first plastic tube in an inlet at the top and with a second plastic tube in an outlet at the bottom allowing passage of the flow of blood or blood plasma through the column and the adsorbent therein, and wherein said first and second plastic tube are connected with each other via a female/male luer coupling.

7. A kit containing the column according to claim 5 within a sealed plastic bag, wherein all of the components within said sealed plastic bag are sterile.

8. The kit according to claim 7, wherein the plastic bag has resistance against penetration of microorganisms, and wherein at least one side of the plastic bag is permeable for steam used in an autoclaving procedure.

9. The kit according to claim 7, wherein the adsorbent comprises at least one protein as the antigen, preferably RF (Rheumatoid factor), or a recombinant form thereof.

10. A method for the production of the kit according to claim 7, wherein the column provided with the adsorbent therein is placed in the plastic bag, wherein said plastic bag is sealed, and wherein the sealed plastic bag containing the column including said adsorbent is sterilized, preferably by autoclavation, wherein steam permeates the wall of the sealed plastic bag into the interior thereof.

11. A method for treatment of rheumatoid arthritis, wherein blood or blood plasma from a patient suffering from rheumatoid arthritis (RA) is brought to pass through the column of the kit according to claim 7 via openings in the locks of the column, wherein autoantibodies existing in connection with rheumatoid arthritis are bound to the adsorbent, and wherein blood or blood plasma having a reduced or eliminated content of said autoantibodies existing in connection with rheumatoid arthritis is collected after having passed through said kit and is returned back to the patient.

* * * * *